Aug. 17, 1954

S. T. BREWER

TELEPHONE SET 2,686,844

Filed April 13, 1953

2 Sheets-Sheet 1

INVENTOR
S. T. BREWER
BY [signature]
ATTORNEY

Aug. 17, 1954 S. T. BREWER 2,686,844

TELEPHONE SET

Filed April 13, 1953

2 Sheets-Sheet 2

INVENTOR
S. T. BREWER
BY [signature]
ATTORNEY

Patented Aug. 17, 1954

2,686,844

UNITED STATES PATENT OFFICE 2,686,844

TELEPHONE SET

Sherman T. Brewer, Chatham Township, Morris County, N. J., assignor to Bell Telephone Laboratories, Incorporated, New York, N. Y., a corporation of New York Application April 13, 1953, Serial No. 348,434

3 Claims. (Cl. 179—81)

Figure 1:
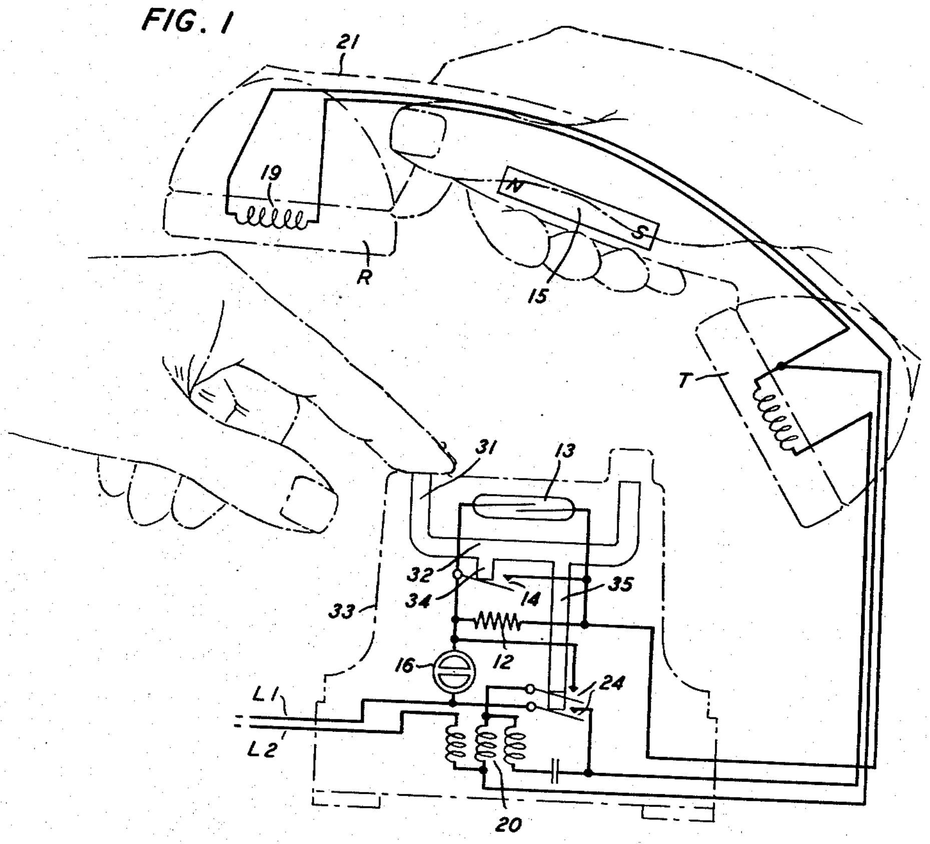

This invention relates to telephone substation sets. More particularly it relates to a circuit of a telephone set wherein the receiver performs the signaling function.

In telephone sets of the type wherein the receiver is utilized for signaling as well as for speech translation, there is a probability that the high intensity signal will be transmitted while the receiver is at the user's ear between the termination of one connection and the initiation of the succeeding connection.

In the operation of a telephone subset, three possible conditions subsist: one, the normal "on-hook" condition, two, the normal "off-hook" condition, three, an "off-hook" condition with the switchhook depressed manually or by means other than the "cradling" of the handset. In telephone sets adapted for use at stations where the usual ringer is eliminated, signaling is effected by transmitting signaling, for example alternating, current over the line to cause the station receiver to produce an audible signal. Thus, the same circuit is utilized for both signaling and voice transmission. An example of such an arrangement is found in Patent 2,392,321, issued January 8, 1946, to R. E. Hersey. During the normal "on-hook" condition it is desirable to produce a signal of a high level of intensity. During the normal "off-hook" condition, a most efficient listening circuit is desirable. Both conditions are attained by utilizing a low-loss receiver circuit. However, the third situation mentioned above presents a problem.

This third condition may occur when the telephone user manually depresses the switchhook in order to interrupt the circuit upon the termination of one call and preparatory to initiating a succeeding call. During this interval there exists a certain probability that an incoming call will be made which will cause transmission of the signaling current to the receiver with consequent generation of a loud tone in close proximity to the user's ear. With the high level required for normal conditions, this may result in extreme discomfort to the telephone user.

For satisfactory operation of the telephone set, therefore, the receiver circuit should have a low loss for conditions one and two, and a high loss during condition three.

It is an object of this invention to enable receiver signaling without discomfort to the user.

It is a further object of this invention to facilitate receiver signaling of a sufficient level of audibility at all times.

This invention achieves these objectives by the provision of an impedance in series with the receiver, which impedance is shunted by one or the other of a pair of switches in the normal "on-hook" and "off-hook" conditions. Both switches are actuated by the removal of the handset from the cradle.

In one specific embodiment of this invention, one of the pair of switches is operatively connected to the usual switchhook plungers projecting from the handset cradle. The other switch may be of the reed-contact type actuated magnetically by a magnet located within the handset shank. Various arrangements of magnetically actuated switches suitable for utilization in the apparatus of this invention are disclosed in Patent 2,322,851 issued to R. M. Kalb on June 29, 1943. The switches are arranged so that in condition one, the normal "on-hook" position of the handset, the plunger-operated switch is open and the magnetic switch is closed, shunting the impedance. In the normal "off-hook" position, condition two, the switch positions are reversed and the plunger-operated switch shunts the impedance. In the third condition both switches open because the handset containing the magnet remains out of the actuating or "cradled" position and the other switch is opened by manual depression of the switchhook. Thus, by the insertion of a high loss in the receiver circuit the signal is reduced to a level consistent with the user's proximity to the telephone set.

Therefore, a feature of this invention pertains to the provision of means for inserting attenuation into the receiver circuit only during the period when signaling tones may occur in close proximity to the user's ear.

This and other features of the invention will be apparent from the following description together with the drawing which discloses a preferred embodiment of the invention.

Fig. 1 shows a schematic section of a telephone subset in the "off-hook" condition with the switchhook plungers depressed manually.

Figure 2:
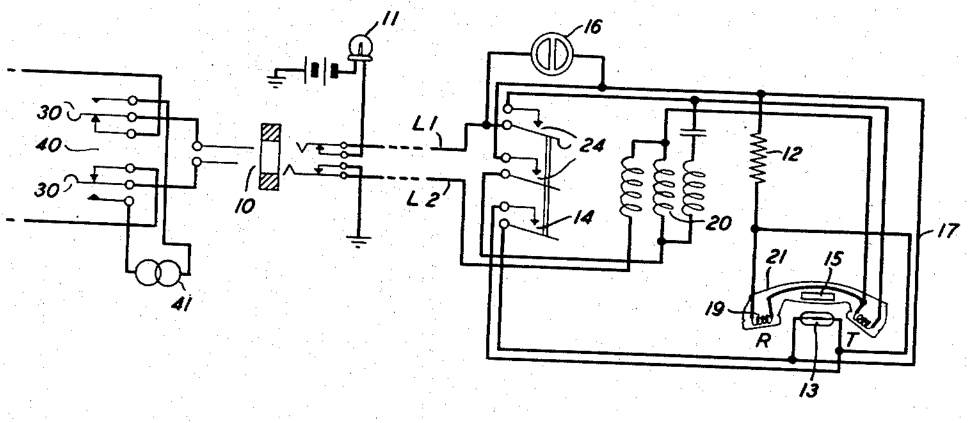
Figure 3:
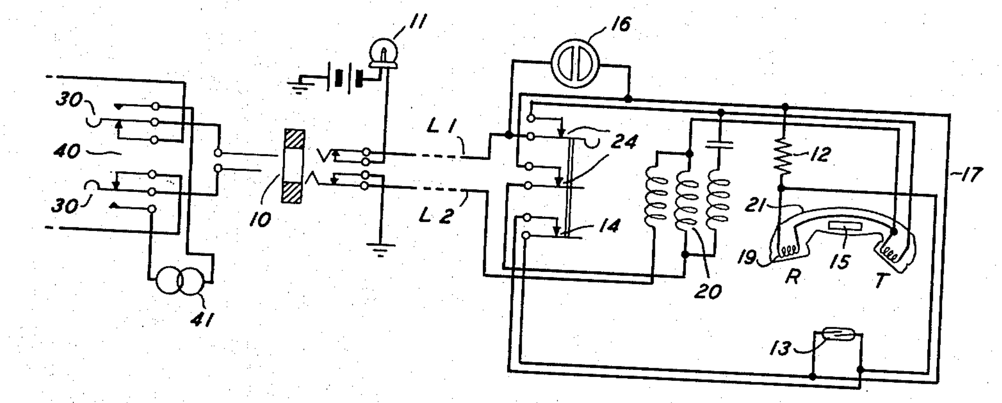
Figure 4:
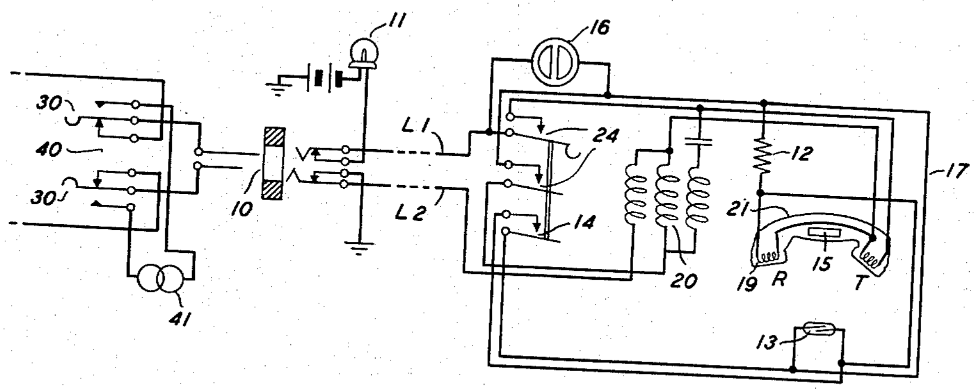

Figures 2, 3 and 4 of the drawing indicate, generally diagrammatically, a telephone subset circuit with a connecting line to a manual switchboard. Fig. 2 represents the normal "on-hook" condition heretofore referred to as condition one. Fig. 3 represents the normal "off-hook" condition or condition two, and Fig. 4 indicates the circuit condition when ringing may occur in the user's ear referred to as condition three.

Referring to Fig. 1 a telephone subset circuit is indicated diagrammatically within the subset mounting 33 and the associated handset 21. The resistance 12 is shown in series with the receiver winding 19. In electrical parallel with the resistance 12 are the magnetically-actuated reed contacts 13 and the mechanically-actuated switchhook contacts 14. With the handset 21 in the "on-hook" position the reed contacts are closed by the magnetic field of the permanent magnet 15 in the handset shank. In the figure, the handset 21 is off the hook and removal of the field permits the reeds to return to the "open" position as shown.

The switchhook plungers 31 are indicated schematically connected by a yoke 32 to which are attached the members 34 and 35 actuating the contacts 14 and 24. In addition to the switchhook contacts 24, other circuit elements include the gas diode 16 and induction coil 20. $L_1$ and $L_2$ indicate the subscriber's line to the switchboard. A more complete understanding of the circuit operation may be obtained from the other figures in which identical reference numbers have been used in so far as applicable.

In Fig. 2 a typical cord circuit 40 is shown adapted to be connected to the switchboard jack 10 of the line $L_1$ and $L_2$ to the subset circuit. The operator's signaling lamp 11 is shown connected in the usual manner. The principal features of the invention are delineated by the part of the circuit including the resistance 12, the reed contacts 13, the third switchhook contacts 14, and the magnet 15 located in the handset 21.

Ringing current is applied to the tip conductor $L_1$ from the ringing generator 41 by the operation of cord circuit ringing key 30. The gas-filled diode tube 16 then breaks down in a well-known manner and ionization occurs whereupon ringing current is conducted in a circuit from the tip conductor $L_1$, the anode-cathode gap of the diode, shunt circuit 17, reed contacts 13, receiver winding 19 and left winding of the induction coil 20 to the other side of the line $L_2$. In this particular embodiment the reed contacts 13 located in the subset base close in order to complete the magnetic circuit associated with the magnet 15 in the handset 21. The resistance 12 is thus shunted providing a low-loss circuit for normal "on-hook" signaling.

Referring now to Fig. 3, removal of the handset from its cradle, indicated diagrammatically by the separation of the handset 21 and the contacts 13, causes the switchhook contacts 14 and 24 to close. Simultaneous removal of the magnetic field permits the reed contacts 13 to open. The handset circuit is then arranged for conversation with the receiver circuit completed through the switchhook contacts 14. The resistance 12 is again shunted resulting in a low-loss circuit for efficient listening.

In the condition shown in Fig. 4, the handset has not been returned to its cradle on the subset base but the user has depressed the switchhook by other means, for example manually. The switchhook contacts 14 and 24 are thereby opened in addition to the reed contacts 13 already open, thereby placing the resistance 12 in series with the receiver winding 19. Thus, ringing current applied during this interval will pass through the diode 16 as before, resistance 12, receiver winding 19 and middle winding of the induction coil 20 to the other side of the line $L_2$. The attenuation thereby introduced into the circuit assures a signal which is audible but not uncomfortable to the subscriber.

It is to be understood that the above-described arrangements are illustrative of the application of the principles of this invention. Numerous other arrangements may be devised by those skilled in the art without departing from the spirit and scope of the invention. For example, it will be obvious that the invention may be carried out by contact-actuating means other than the particular devices disclosed. Likewise, other switching sequences and circuit arrangements may be devised to achieve the result of this invention.

What is claimed is:

1. A telephone set comprising a hand telephone including a receiver, a mounting for said telephone, a pair of line terminals, means connecting said receiver between said terminals including a resistance in series with said receiver, means defining a pair of shunt circuits across said resistance, means actuable by said telephone for closing one of said circuits only when said telephone is on said mounting, and means for closing said other circuit when said telephone is removed from said mounting.

2. A telephone set comprising a hand telephone including a receiver, a mounting for said telephone, a pair of line terminals, means connecting said receiver between said terminals including a resistance in series with said receiver, means defining a pair of shunt circuits across said resistance, means actuable by said telephone for closing one of said circuits only when said telephone is on said mounting, and means including an actuating member projecting from said mounting and positioned to be engaged by said telephone when it is placed on said mounting for closing said other circuit when said telephone is removed from said mounting.

3. A telephone set comprising a hand telephone including a receiver, a mounting for said telephone, a pair of line terminals, means connecting said receiver between said terminals including a resistance in series with said receiver, means defining a pair of shunt circuits across said resistance, magnetic means in said telephone, a set of magnetically-operated contacts actuable by said magnetic means for closing one of said circuits only when said telephone is on said mounting, and means including an actuating member projecting from said mounting and positioned to be engaged by said telephone when it is placed on said mounting for closing said other circuit when said telephone is removed from said mounting.

No references cited.